Oct. 10, 1967 — W. A. REICHOW — 3,346,013
DAMPER CONTROL AND LINKAGE THEREFOR
Filed Nov. 4, 1964 — 3 Sheets-Sheet 1
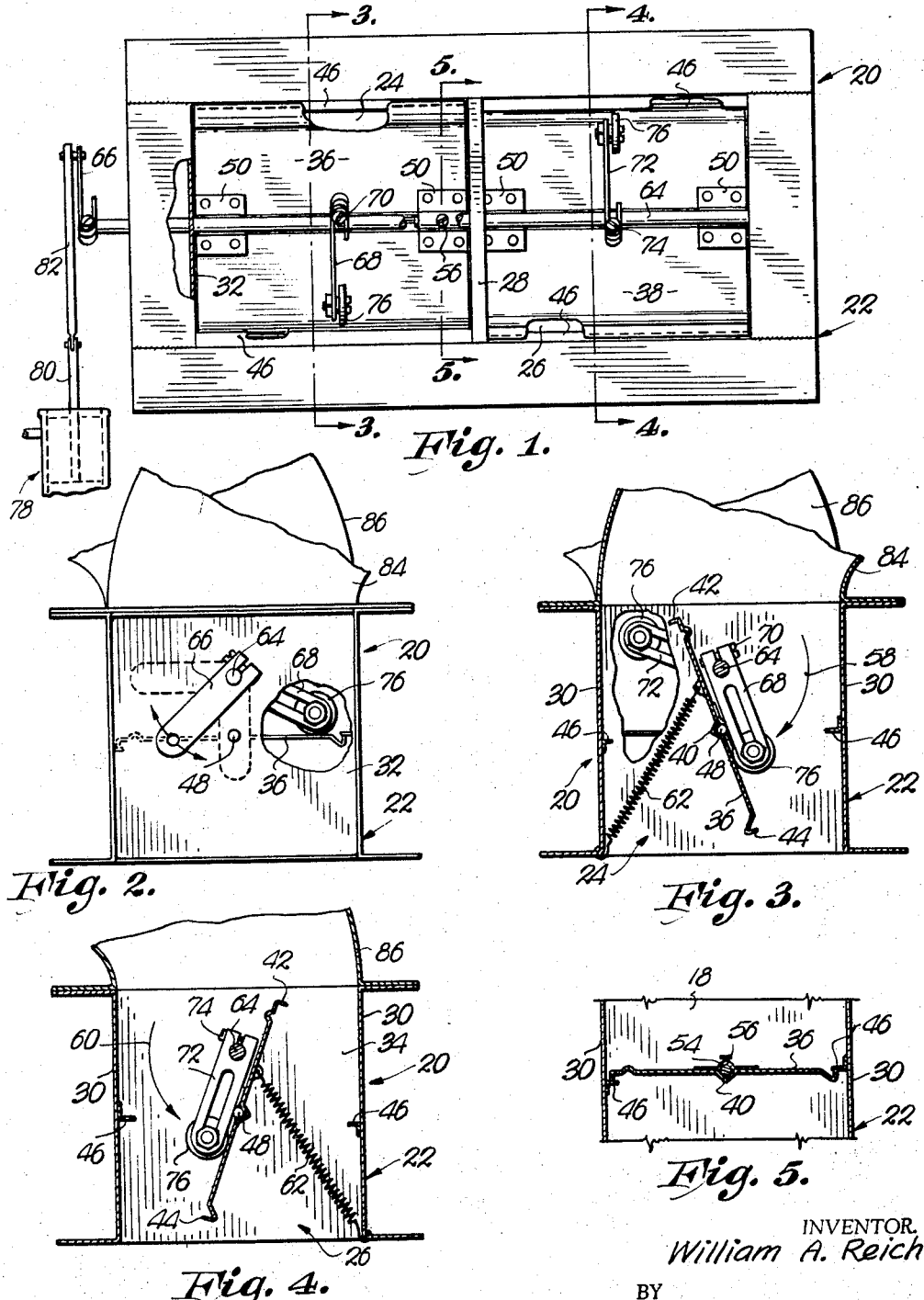
INVENTOR.
William A. Reichow
BY
Hovey, Schmidt, Johnson & Hovey
ATTORNEYS.

INVENTOR.
William A. Reichow
BY
Hovey, Schmidt, Johnson & Hovey
ATTORNEYS

INVENTOR.
William A. Reichow

United States Patent Office 3,346,013
Patented Oct. 10, 1967

3,346,013
DAMPER CONTROL AND LINKAGE THEREFOR
William A. Reichow, Kansas City, Mo., assignor to Ruskin Manufacturing Company, Grandview, Mo., a corporation of Missouri
Filed Nov. 4, 1964, Ser. No. 408,808
6 Claims. (Cl. 137—628)

ABSTRACT OF THE DISCLOSURE

Damper control apparatus for a forced air system having a pair of rotatable blade units across respective fluid passages, the apparatus including a single power source connected through linkage for alternatively rotating each blade between an equilibrium position defined by stops and an operative position, thereby varying the flow of air through the passages. The apparatus may include parallel linkage for effecting the alternating rotation of the blades, and may also include means arranged to start one blade toward its operative position after a predetermined rotation of the other blade toward its operative position.

---

This invention relates to improvements in dampers for use in ventilation systems and has as its primary object the provision of improved damper structure utilizing a single power source for actuating two or more dampers controlling respective fluid passages, whereby substantial economies are obtained by eliminating power sources for individual dampers and the dampers may be sequentially operated by the single source so as to obtain minimum volume flow rates through their passages as desired.

Another object of this invention is the provision of a damper structure of the type described which is relatively simple and rugged in construction to provide a long, useful operating life with a minimum of maintenance and which is adapted for use in a variety of applications requiring dampers capable of withstanding stresses thereon due to air under pressure over a wide operating range.

A further object of the instant invention is to provide a damper assembly which can be used with side-by-side air ducts leading from respective sources of hot and cold air to a region remote from the sources, whereby the assembly is capable of controlling the volume rate of flow or air from each of the ducts to the region by the selective actuation of a single motor forming a part of the assembly to thereby control the air temperature of the region as desired.

Yet a further object of the present invention is the provision of damper structure of the type having at least two dampers connected together as a unit and wherein the actuation of one damper precedes that of the other damper by a finite time interval whereby the volume rate of flow of a fluid past the dampers may be more accurately controlled than is capable with conventional damper construction having a pair of dampers which, at all times, move together.

In the drawings:

FIGURE 1 is a top plan view of a first embodiment of the instant invention illustrating a pair of damper blades rotatably mounted in conduit structure across respective fluid passages, parts being broken away and in section to illustrate details of construction;

FIG. 2 is a slide elevational view of the damper structure illustrated in FIG. 1 and showing the equilibrium positions of the damper blades;

FIG. 3 is a cross-sectional view taken along line 3—3 of FIG. 1 and illustrating an operative position of one of the damper blades;

FIG. 4 is a cross-sectional view taken along line 4—4 of FIG. 1 illustrating an operative position of the other of the damper blades;

FIG. 5 is a cross-sectional view taken along line 5—5 of FIG. 1;

Figure 6:
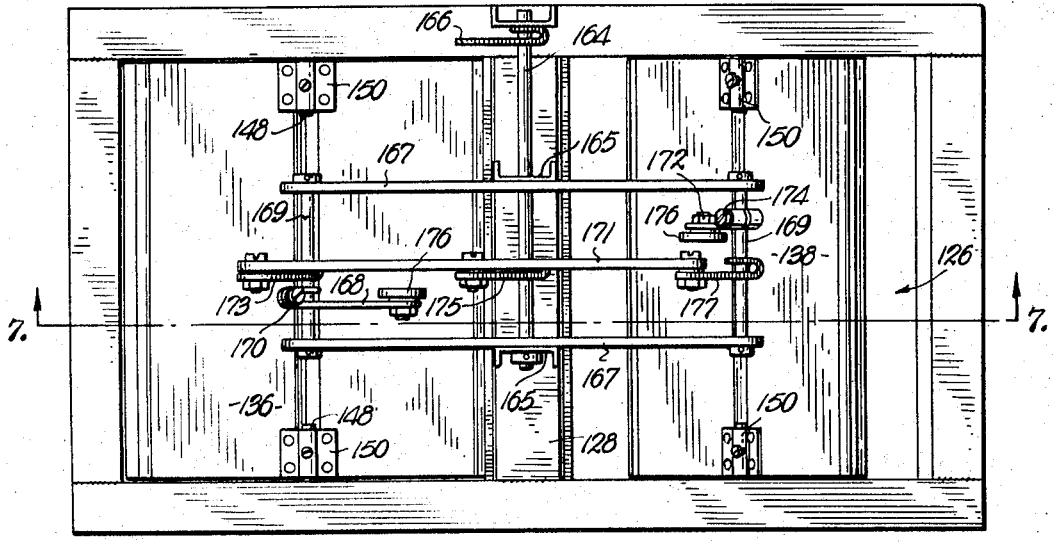
FIG. 6 is a top plan view of a second embodiment of the invention.

The present invention provides improved damper control apparatus for use in forced air systems and includes means whereby at least a pair of damper blade units positioned across respective fluid passages, can be effectively and efficiently controlled with a single source of power. A first embodiment of the invention includes conduit structure defining a pair of fluid passages and a pair of damper blades rotatably mounted on the conduit structure within the fluid flow of respective passages.

Power-actuated means including a single source of power is operably coupled to the damper blades so that when one of the damper blades is moved to an operative position permiting fluid flow through the respective passage, the other damper blade is maintained at an equilibrium position in its fluid passage. Conversely, as the other damper blade is moved to an operative position permitting substantial fluid flow through its passage, the aforesaid one damper blade is maintained at its equilibrium position. Generally, the equilibrium positions of the damper blades are across the respective passages in blocking relationship thereto. However, mechanism is provided to vary the equilibrium positions of the damper blades with respect to the conduit structure. As a result, fluid flow through the passages is more effectively controlled.

A second embodiment of the invention is distinguished from the first embodiment by virtue of a parallel linkage which forms a part of the power means for alternately rotating the damper blades into operative positions from their respective equilibrium positions. By virtue of this parallel linkage construction, the arcs through which the damper blades rotate may be more effectively controlled.

A third embodiment of the invention includes a pair of damper blade units across respective fluid passages, the damper blade units being operably coupled to a power source having linkage structure forming a part thereof so that one of the damper blade units is not moved from its equilibrium position toward an operative position until the other damper blade unit has moved through a predetermined distance away from its equilibrium position and toward an optimum operating position. Hence, there is a delay between the operation of the damper blade unit following the commencement of operation of the other damper blade unit. This permits finer control of the air flow through an air system inasmuch as the damper blade units do not move simultaneously as was heretofore necessary with conventional damper structures.

In the first embodiment illustrated in FIGS. 1–5, damper control 20 includes conduit means 22 having interconnected walls defining a pair of side-by-side fluid passages 24 and 26. A central partition 28 and a pair of spaced end walls 32 and 34 span the distance between side walls 30 to define with the latter the boundaries of passages 24 and 26.

Damper blades 36 and 38, provided for passages 24 and 26, respectively, each have a longitudinally extending central recess defined by a rib 40. Laterally projecting, longitudinally extending end edges 42 and 44, provided for each of the blades 36 and 38, are disposed to contact transversely L-shaped stops 46 secured to the inner surfaces of side walls when blades 36 and 38 are in blocking relationship to passages 24 and 26 respectively.

A pair of stub shafts 48, provided at the opposed ends of the recess of each damper blade, project outwardly from the blade and are journalled in the proximal wall whereby blades 36 and 38 are mounted for rotation about substantially aligned, coextensive axes. Brackets 50 are connected by machine screws 52 to the proximal faces of blades 36 and 38 to retain stub shafts 48 in the corresponding recesses. Each bracket 50 has a depression formed by a rib 54 which when aligned with a corresponding recess, loosely receives a part of corresponding stub shaft as shown in FIG. 5. A set-screw 56 carried in each bracket 50 releasably secures the damper blades to the corresponding stub shafts 48.

Blades 36 and 38 rotate in opposite directions to each other because of the positions of stops 46 and rotate into and out of closing relationship to respective passages 24 and 26. As shown in FIG. 2, blade 36 is normally in the closed equilibrium position blocking fluid passage 24 with edges 42 and 44 engaging stops 46. In similar manner, blade 38 normally closes fluid passage 26 in its equilibrium position.

In FIG. 3, blade 36 is illustrated in an operative position after being rotated in a clockwise sense in the direction of the arcuate arrow 58 away from its equilibrium position; whereas, in FIG. 4, blade 38 is shown in an operative position after being rotated in a counterclockwise sense in the direction of arrow 60. A coil spring 62, provided with each damper blade respectively, biases the same toward its equilibrium position. Springs 62 are secured at one end thereof to a convenient location on conduit means 22.

Means is provided to alternately rotate blades 36 and 38 in the directions of arrows 58 and 60, blade 38 remaining stationary as blade 36 is rotated and blade 36 remaining stationary as blade 38 is rotated. An elongated shaft 64, parallel to and aligned with stub shafts 48, extends through and is journalled in partition 28 and end walls 32 and 34 as illustrated in FIG. 1. One end of shaft 64 extends outwardly from wall 32 and is provided with an arm 66 rigid to and extending laterally therefrom.

A first blade-engaging arm 68 is releasably secured by screw means 70 to shaft 64 at a location thereon intermediate partition 28 and end wall 32. A second blade-engaging arm 72 is releasably secured by screw means 74 to shaft 64 between partition 28 and end wall 34. Arms 68 and 72 extend in opposite directions from shaft 64 and toward respective blades 36 and 38. A wheel or roller 76 is provided on the outer end of each of the arms 68 and 72 respectively for engaging the corresponding blade to minimize wear thereon as the blade is rotated under the influence of the wheel. Arms 68 and 72 are slotted, and the axles of shafts of wheels 76 are received within the slots thereof. Hence, the positions of wheels 76 along arms 68 and 72 may be adjusted as desired.

Means for rotating shaft 64 includes a power source 78 which, for purposes of illustration only, includes a fluid piston and cylinder assembly having a piston rod 80 pivotally secured to the outer end of arm 56. It is to be understood that other sources of power could be used, such as pneumatic, hydraulic or electric motors, or a manually actuated crank. Power source 78 is of the type having an equilibrium position between a pair of opposed limits.

Arm 66, in its equilibrium location shown in FIG. 2, is coupled with rod 82 when power source 78 is in its equilibrium position and when wheels 76 of arms 68 and 72 simultaneously engage the proximal faces of blades 36 and 38, respectively. Hence, as power source 78 is actuated to move rod 80 in one direction, one of the blades will be rotated to open the corresponding fluid passage, while the other blade will remain stationary. Conversely, as power source 78 is actuated in the opposite direction, the other blade will be rotated while the first mentioned blade will remain stationary.

In operation, conduit means 22 is coupled with tubing, such as a pair of air ducts 84 and 86 communicating with passages 24 and 26 respectively. Ducts 84 and 86 may be of the type which lead from respective sources of hot and cold air to a region remote from such air sources so as to heat or cool the region as is desired. With arm 66 in its equilibrium position, blades 36 and 38 close passages 24 and 26.

When arm 66 is rotated in a clockwise sense, when reviewing FIG. 2 arm 68 causes blade 36 to shift in the direction of arrow 58 so as to open passage 24. At the same time, arm 72 moves away from blade 38 and is spaced from the latter when blade 36 is in any of its operative positions. As arm 66 is returned to its equilibrium position, spring 62 returns blade 36 to its equilibrium position.

Conversely, when arm 66 is rotated in a counterclockwise sense, arm 72 causes blade 38 to rotate in the direction of arrow 60 into any of its operative positions as arm 68 swings away from blade 36. Spring 62 of blade 38 returns the latter to its equilibrium position as arm 66 returns to the position thereof shown in FIG. 2.

By manipulating setscrews 56 on brackets 50, the equilibrium positions of blades 36 and 38 may be changed whereby the corresponding passages may be partially opened by a desired amount rather than being closed. In this way, there will be a certain minimum flow at all times through the passage. Arm 66 would still have the same equilibrium position while arms 68 and 72 would have to be re-positioned so that wheels 76 engage respective blades. Screw means 70 and 74 permit this re-positioning of arms 68 and 72.

Figure 7:
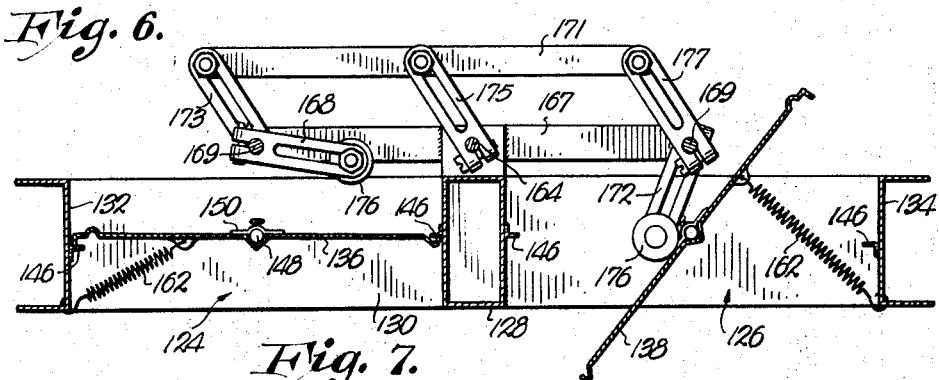
FIG. 7 is a cross-sectional view taken along line 7—7 of FIG. 6 and illustrating one damper blade in an equilibrium position, and another damper blade in an operative position.
Figure 8:
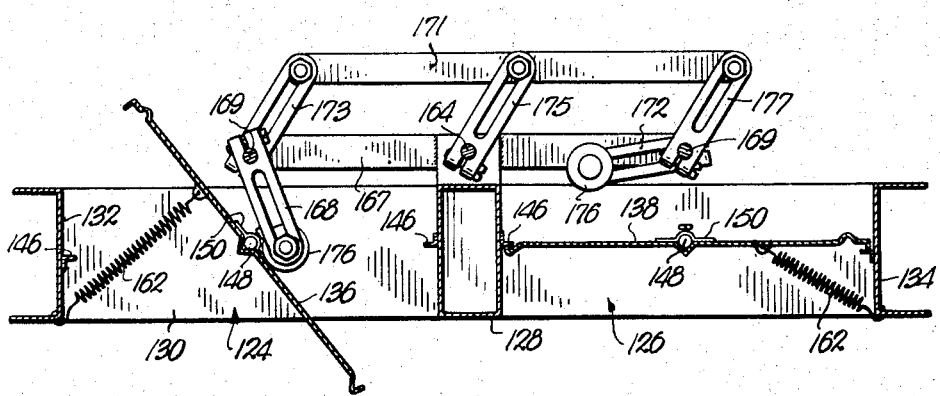
FIG. 8 is a view similar to FIG. 7 but with the positions of the damper blades reversed.

Damper control 120, forming a second embodiment of the invention and illustrated in FIGS. 6–8, includes conduit means 122 defining side-by-side fluid passages 124 and 126. A central partition 128 and spaced end walls span the distance between a pair of side walls 130 to define with the latter the boundaries of passages 124 and 126. A pair of damper blades 136 and 138, substantially identical to blades 36 and 38, have stub shafts 148 journalled in opposed side walls 130 to mount blades 136 and 138 for rotation about parallel axes. Stops 146 on partition 128 and end walls 132 and 134 limit the rotation of blades 136 and 138 to specific directions in the manner described above. Blade 136 is free to rotate only in a clockwise sense when viewing FIG. 7; whereas, blade 138 is free to rotate only in a counterclockwise sense. Brackets 150 releasably secure stub shafts 148 to respective blades 136 and 138 and coil springs 162 bias blades 136 and 138 toward their equilibrium positions in closing relationship to passages 124 and 126, respectively.

It is to be understood that two or more blades could be used in place of each of the damper blades 136 and 138. In this case, the blades would be mounted on respective shafts for rotation about parallel axes and would be directly coupled together by links so that, when one of the blades is shifted, all of the blades would be shifted simultaneously in directions either to open or to close the corresponding passage.

A main shaft 164, journalled for rotation in a pair of rigid members 165 on partition 128 is substantially midway between and parallel to stub shafts 148 and spaced laterally from a plane passing therethrough. A pair of rigid bars 167 are secured to and extend laterally from opposed sides of members 165 and terminate in alignment with and spaced from the central recesses in respective blades 136 and 138. A pair of side shafts 169 are journalled in respective ends of bars 167 and are parallel with shaft 164. An arm 168 is releasably secured by screw means 170 to the shaft 169 corresponding to blade 136. Arm 168 extends toward shaft 164 and toward the proximal face of blade 136. A wheel or roller 176 is provided at the outer end of arm 168 and, as shown in dashed lines in FIG. 7, normally engages blades 136 when the latter is in its equilibrium position.

An arm 172 is releasably secured by screw means 174 to the other shaft 169 and also has a wheel 176 at the outer end thereof which normally engages blade 138. Arm 172 extends toward shaft 164 and thereby toward the opposite arm 168. A link 171 is pivotally secured to the outer ends of arms 173, 175 and 177 rigidly secured at their inner ends to the side shaft 169 of blade 136, to shaft 164 and to the other shaft 169, respectively. Arms 173, 175 and 177 are equal in length so that they form a parallel linkage with bars 167 and link 171. Thus, rotation of shaft 164 causes shafts 169 to rotate by the same amount and in the same direction. As shaft 164 rotates in a counterclockwise sense, arm 172 swings blade 138 to open passage 126. Conversely, when shaft 164 is rotated in the opposite direction, arm 168 rotates blade 136 in a direction to open passage 124. It is to be noted that when one blade is opened by its respective arm, the other blade is maintained in its equilibrium position closing the corresponding passage.

In operation, conduit means 122 is coupled in any suitable manner, such as with ducts carrying hot and cold air from respective sources to a region to be heated or cooled. An arm 166, similar to arm 66, is coupled to a suitable source of power such as one of a type similar to source 78 for rotating shaft 164 in opposed directions. When no air is to be supplied to the region, arm 166 remains in an equilibrium located with blades 136 and 138 in their equilibrium positions closing passages 124 and 126. In this situation, wheels 176 engage blades 136 and 138.

Upon rotation of shaft 164 in a predetermined direction, one of the blades is shifted to open the corresponding passage to thereby permit flow of air therethrough. The power source coupled with arm 166 may be responsive to the temperature of the region, such as by a thermostat or the like, so that blades 136 and 138 are selectively actuated, depending upon the initial setting of the thermostat or other control connected with the power source.

Springs 162 return blades 136 and 138 to their equilibrium positions after arm 166 returns to its equilibrium location. The equilibrium positions of blades 136 and 138 can be varied by manipulating setscrews on brackets 150.

Damper blade operation of the embodiment of FIGS. 1–5 and the embodiment of FIGS. 6–8 is effected by a single control motor or power source. Hence, sources of power for individual damper blades are unnecessary.

Damper control 220, forming the third embodiment of the instant invention and illustrated in FIGS. 9–13, includes conduit means 222 having a first damper unit 226 and a second damper unit 228 in side-by-side relationship. Each damper unit includes a number of damper blades 230 which are interconnected by links 232 and 234 so that blades 230 operate as a unit to open or close a fluid passage with which the blades are associated. For purposes of illustration, three blades 230 are provided, the outer blades being rotatable in the opposite direction.

Figure 9:
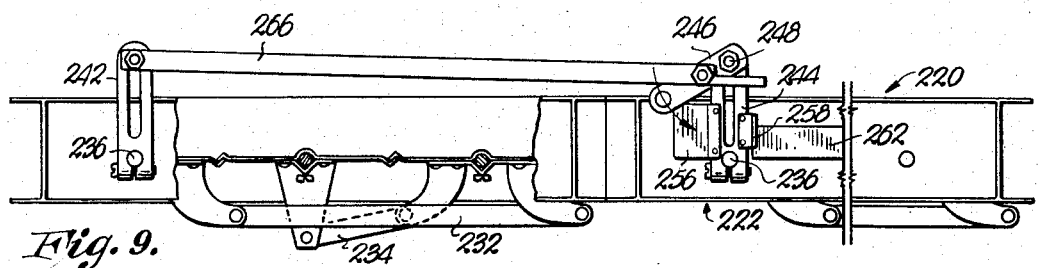
FIG. 9 is a top plan view of a third embodiment of the invention, parts being broken away to reveal details of construction.
Figure 10:
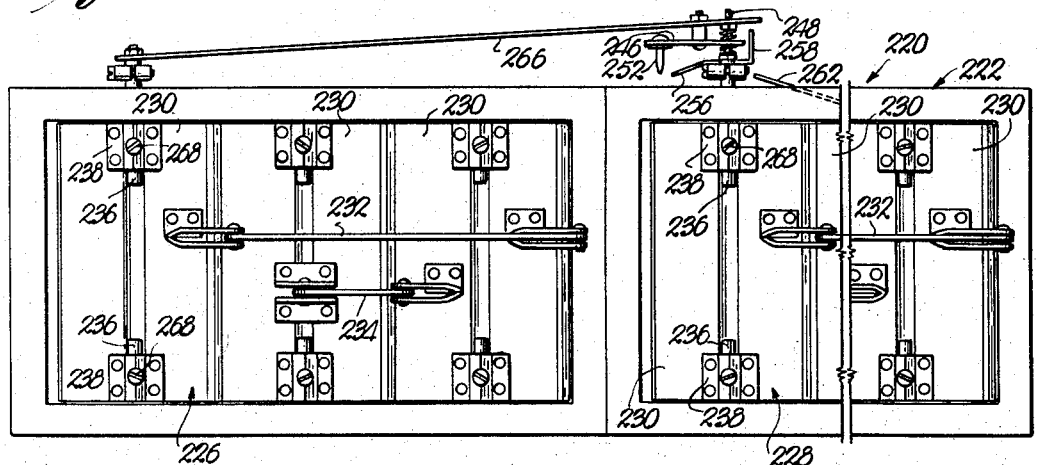
FIG. 10 is a side elevational view of the embodiment of FIG. 9 and showing a pair of damper blade units in their equilibrium positions.

Stub shafts 236 secured by brackets 238 to respective blades 230 are journalled in opposed walls 240 so that blades 230 rotate about parallel axes from positions closing the corresponding fluid passages to positions opening the fluid passages. A stub shaft 136 corresponding to each damper unit extends outwardly from one of the walls 240 and an arm 242 is releasably secured to the outer end of shaft 236 corresponding to unit 226 as illustrated in FIG. 9. Similarly, an arm 244 is releasably secured to the outer end of stub shaft 236 corresponding to unit 228. A lever 246 is pivotally secured at one end thereof to a carriage bolt 248 or the like secured to and extending laterally from the outer end of arm 244. A coil spring 250, on each side of lever 246 in surrounding relationship to bolt 248, releasably maintains lever 246 intermediate the ends of bolt 248.

Figure 11:
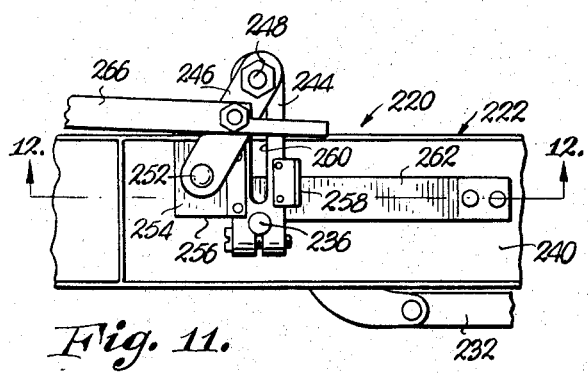
FIG. 11 is an enlarged, fragmentary, top plan view of the structure illustrating the positions of various operating parts thereof when one of the damper blade units is partially open.
Figure 13:
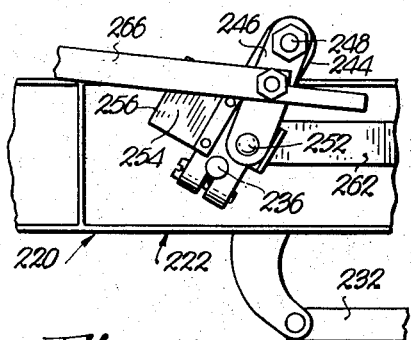
FIG. 13 is a view similar to FIG. 11 but illustrating the positions of the operating parts when both of the damper blade units are open.
Figure 12:
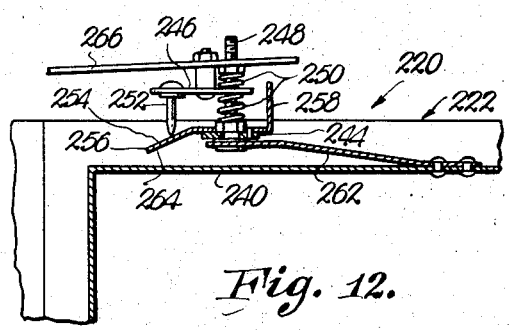
FIG. 12 is a cross-sectional view taken along line 12—12 of FIG. 11.

A pin 252, secured at the opposite end of lever 246 and extending laterally therefrom, moves along the inclined surface 254 of a rigid member 256 mounted on and extending outwardly from one side of arm 244, as illustrated in FIGS. 11 and 12, when lever 246 rotates in a counterclockwise sense when viewing FIG. 11. A transversely L-shaped stop 258 is rigid to and extends outwardly from the opposite side of arm 244 and is disposed within the path of travel of lever 246 so that, when the latter engages stop 258, continued movement of lever 246 will cause arm 244 to rotate in a clockwise sense when viewing FIGS. 11 and 13. In FIG. 13, arm 244 is shown in an operative position after being rotated by lever 246.

Arm 244 is provided with a slot 260 which overlies an elongated spring 262 secured at one end thereof to the proximal wall 240. The opposite end of spring 262 is in the path of travel of the lower surface 264 of member 256 so that spring 262 is deflected toward the proximal wall 240 as arm 244 rotates under the influence of lever 246.

A link 266 is pivotally secured at one end thereof to arm 242 and at the other end thereof to lever 246 at a location thereon between bolt 248 and pin 252. Lever 246 thus rotates with arm 242 but in the opposite sense relative thereto. Since arm 244 commences to rotate only after arm 242 has rotated through a predetermined arc, damper control 220 provides means whereby finer control of an air flow can be obtained.

In operation, conduit means 222 is operably coupled with a source of fluid under pressure such as a forced air system, so that units 226 and 228 control the flow of the fluid from the source to a region adapted to receive the air. The equilibrium position of blades 230 are normally closed, but such positions can be changed in the manner described above by manipulating setscrews 268 on brackets 238. Generally, blades 230 will close the corresponding fluid passages so that when arms 242 and 244 are in the positions thereof shown in FIGS. 9 and 10, no fluid passes through conduit means 22.

Arm 242 is adapted to be operably coupled to a power source, such as source 78, to cause rotation of arm 242 in a clockwise sense through a predetermined arcuate distance and return. As arm 242 is initially rotated, it will in turn, impart rotation to the blades 230 coupled therewith to thereby open the fluid passage associated therewith by a predetermined amount. Simultaneously with the rotation of arm 242, level 246 will be rotated in a counterclockwise sense under the influence of link 266. If only a minimum volume rate of flow of air is desired, arm 242 will be moved to an operative position corresponding to which lever 246 will not have yet engaged stop 258. Hence, the desired rate of flow can be obtained without actuating unit 228.

However, if increased flow is desired, continued rotation of arm 242 will cause lever 246 to continue to rotate in a counterclockwise sense when viewing FIG. 11 until it engages stop 258. As lever 246 moves toward stop 258, pin 252 will move upwardly along surface 254 of member 256 to, in turn pivot lever 246 upwardly against the bias force of the upper spring 250. Pin 252 will pass over slot 260 during this movement but will not drop into the slot because spring 262 is across the same from beneath arm 244. Continued movement of lever 246 after it engages stop 258 will cause arm 244 to rotate in a clockwise sense when viewing FIG. 11. This results in the opening of blades 230 of unit 228 and the downward deflection of spring 262, whereby slot 260 is cleared. In FIG. 13, with arm 244 shown in a position corresponding to that in which blades 230 of unit 228 are open, spring 262 has been deflected toward wall 40 by surface 264 of member 256. For purposes of illustration only, arm 244 does not begin to rotate until arm 242 has rotated approximately 30°. As arm 242 rotates from 30° to 90°, arm 244 will rotate from 0° to 90°. At this point, units 226 and 228 are fully open.

When it is desired to close units 226 and 228, arm 242 is rotated in a counterclockwise sense and pin 252 will drop into slot 260 of arm 244 under the influence of the bias force of springs 250 on lever 246 inasmuch as spring 262 is spaced below arm 244 and clears slot 260. Pin 252 will thus interconnect arm 244 and lever 246 to effect counterclockwise rotation of arm 244 until spring 262 forces pin 252 out of slot 260. This occurs when spring 262 moves upwardly as surface 264 of member 256 moves out of engagement therewith. At this point, arm 244 is in its initial position shown in FIGS. 9 and 11 and unit 228 closes the corresponding passage. Similarly, when arm 242 returns to its initial position, unit 226 will close its corresponding passage. It is to be understood that bias structure other than springs 250 can be used to perform the function of spring 250. In lieu of springs 250 or other bias structure coupled with lever 246, pin 252 could be biased downwardly on the outer end of lever 246 in any suitable manner.

The construction of damper control 220 permits the volume rate of flow through conduit means 222 to be precisely controlled inasmuch as only one of the damper units may be opened while the other damper unit remains closed. This is especially important when air under pressure is being delivered through conduit means 222 because the volume rate of flow past blades 230 will be greater if the air is under a large pressure than if the air is under a small pressure. Hence, damper control 220 is especially suitable for use with systems employing air under high pressures.

The time delay or interval following which arm 244 is rotated, can be controlled by the connection of link 266 with lever 246. The closer the connection is to bolt 248, the shorter the delay time. Also, the placement of stop 258 will determine the arcuate distance through which arm 244 will traverse for a given arcuate displacement of arm 242.

It is further to be noted that units 226 and 228 are operated from a single source of power. Hence, power sources for individual damper units are necessary. Although only two damper units 226 and 228 have been illustrated in FIGS. 9 and 10 and described herein, it is to be understood that more than two such units could be employed across respective fluid passages. In such a case, time delay structure of the type described hereinabove would be used to interconnect each pair of adjacent units. Thus, second time delay structure would interconnect unit 228 with a third damper unit adjacent thereto so that the damper blades of the third unit would not be shifted toward an open position until the blades of unit 228 had been opened by a predetermined amount. Similarly, the blades of a fourth damper unit would not be opened until the blades of the third unit had been opened by a preselected amount.

Having thus described the invention, what is claimed as new and desired to be secured by Letters Patent is:

1. Air flow control apparatus comprising:
conduit structure having wall means defining a pair of side-by-side fluid passages;
first shaft structure for each passage respectively, each first shaft structure extending into its respective passage and being journalled in said wall means for rotation relative to said conduit structure, the longitudinal axes of said first shaft structures being substantially coextensive;
a damper blade for each first shaft structure respectively;
means releasably securing each blade to its respective first shaft structure for rotation with the latter, said blades normally being disposed in respective primary equilibrium positions in at least partially blocking relationship to respective passages;
a stop for each blade respectively, the stops being secured to said wall means and extending into the path of rotation of respective blades, the stop of one of said blades being disposed to prevent rotation thereof in one direction when said one blade is in its primary equilibrium position, the stop of the other blade being disposed to prevent rotation thereof in the opposite direction when the other blade is in its primary equilibrium position, said stops being disposed to permit said one blade and said other blade to move in said opposite direction and said one direction respectively away from their respective primary equilibrium positions;
means biasing each blade toward its equilibrium position;
a second shaft parallel to said first shaft structures and being journalled in said wall means for rotation in either of said directions;
a pair of spaced arms rigid to and extending laterally from respective, opposed sides thereof;
a roller on the outer end of each arm respectively, said second shaft having an equilibrium location, said arms being disposed with the wheels thereof in engagement with respective blades when the latter are in their primary equilibrium positions and said second shaft is in said equilibrium location; and
power means coupled with said second shaft for selectively rotating the latter alternately in said directions, whereby said one blade may be rotated in said opposite direction as said other blade remains in its primary equilibrium position and said other blade may be rotated in said one direction as said one blade remains in its primary equilibrium position.

2. Air flow control apparatus comprising:
conduit structure having wall means defining a pair of side-by-side fluid passages;
first shaft structure for each passage respectively, each first shaft structure extending into its respective passage and being journalled in said wall means for rotation relative to said conduit structure, the longitudinal axes of said first shaft structures being substantially parallel;
a damper blade for each first shaft structure respectively;
means releasably securing each blade to its respective first shaft structure for rotation with the latter, said blades normally being disposed in respective primary equilibrium positions in at least partially blocking relationship to respective passages;
a stop for each blade respectively, the stops being secured to said wall means and extending into the path of rotation of respective blades, the stop of one of said blades being disposed to prevent rotation thereof in one direction when said one blade is in its primary equilibrium position, the stop of the other blade being disposed to prevent rotation thereof in the opposite direction when the other blade is in its primary equilibrium position, said stops being disposed to permit said one blade and said other blade to move in said opposite direction and said one direction respectively away from their respective primary equilibrium positions;
means biasing each blade toward its equilibrium position;

a second shaft parallel to said first shaft structures and being journalled in said wall means for rotation in either of said directions;

a pair of third shafts parallel to said first shaft structures and said second shafts on opposed sides of said second shaft, and in alignment with respective first shaft structures, said second shaft being disposed substantially midway between said third shafts, said third shafts being journalled in said wall means for rotation relative to said member in said directions;

an arm rigidly secured to each third shaft respectively, the arms extending outwardly from respective third shafts and toward said second shaft;

a roller on the outer end of each arm respectively, said second shaft having an equilibrium location and said third shafts having respective equilibrium dispositions, said arms being disposed with the wheels thereof in engagement with respective blades when the latter are in their primary equilibrium positions and said third shafts are in their equilibrium dispositions;

linkage means connecting said third shafts with said second shaft for rotation therewith in said directions, said third shafts being in said equilibrium dispositions thereof when said second shaft is in said equilibrium location; and power means coupled with said second shaft for rotating the same, whereby said one blade may be rotated in said opposite direction as said other blade remains in its primary equilibrium position and said other blade may be rotated in said one direction as said one blade remains in its primary equilibrium position.

3. Air flow control apparatus comprising:

conduit structure having wall means defining a pair of side-by-side fluid passages;

a damper blade unit for each passage respectively, each unit having a shaft journalled in said wall means for rotation in opposed directions relative thereto, said units being movable into and out of at least partially blocking relationship to respective passages as said shafts rotate in said directions;

means interconnecting the shafts of said units for rotating said shafts together in one direction through a preselected arc only after one of the shafts has been rotated in said direction through a predetermined distance;

said interconnecting means including a pair of relatively shiftable parts, one of said parts being secured to the other of said shafts, the other part being coupled to said one shaft for movement thereby, and means joining said parts together as a unit after said other part has been shifted relative to said one part through a second distance as said one shaft is rotated through said predetermined distance, whereby continued rotation of said one shaft in said one direction will cause rotation of the other shaft therewith, said other part being pivotally coupled to said one part for rotation with respect thereto, said joining means including a stop carried by said one part within the path of rotation of said other part; and means coupled with said one shaft for rotating the same.

4. Air flow control apparatus as set forth in claim 3, wherein said one part includes an arm secured at one end thereof to said other shaft, said other part including a lever pivotally coupled at one extremity thereof to the opposite end of said arm, said interconnecting means further including a link coupled at one end thereof to said one shaft and at the opposite end thereof to said lever intermediate the extremities of the latter.

5. Air flow control apparatus comprising:

conduit structure having wall means defining a pair of side-by-side fluid passages;

a damper blade unit for each passage respectively, each of said units including a number of interconnected damper blades and a shaft secured to one of the damper blades and extending outwardly from the corresponding passage through said wall means, said shafts being rotatable in opposed directions to move their damper blades alternately into and out of at least partially blocking relaitonship to respective passages;

an arm rigid to and extending laterally from the outer end of each shaft respectively;

an extension rigid to and projecting outwardly from the outer end of one of said arms;

a pair of coil springs surrounding said extension;

means retaining the springs on said extension;

a lever swingably mounted adjacent one extremity thereof to said extension between said springs and normally projecting laterally from said extension, whereby the opposite extremity of said lever is spaced from said one arm and may move toward or away from the latter;

a projection carried by said lever at the opposite extremity thereof, and having a length greater than the distance between said one arm and said lever;

a member rigid to one side of said one arm and having an inclined surface within the path of travel of said projection as the latter moves with said lever relative to said one arm;

a stop rigid to the opposite side of said arm and being disposed within the path of swinging movement of the lever whereby, when said lever moves in one direction and engages said stop, said one arm and said lever are effectively joined for rotating said one arm in said direction as said lever continues to move, said projection being movable along said inclined surface and across said slot as said lever moves toward said stop;

a spring carried by said conduit structure and normally blocking the slot of said one arm to prevent said projection from entering the slot as said lever moves toward said stop, said member being engageable with said spring to deflect the latter away from said slot and to maintain the spring spaced from the slot as said lever and said one arm move together in said one direction, whereby the projection may be received in said slot to effect rotation of said one arm and thereby the corresponding shaft in the opposite direction as said lever is moved in said opposite direction;

a link pivotally coupling the outer end of the other arm with said lever intermediate the extremities of the latter to thereby move said lever alternately in said directions as said other arm is rotated in said directions; and means coupled with said other arm for alternately rotating the same in said directions.

6. Air flow control apparatus comprising:

conduit structure having wall means defining a pair of side-by-side fluid passages;

a damper blade unit for each passage respectively, each unit having a shaft journalled in said wall means for rotation in opposed directions relative thereto, said units being movable into and out of at least partially blocking relationship to respective passages as said shafts rotate in said directions;

means interconnecting the shafts of said units for rotating said shafts together in one direction through a preselected arc only after one of the shafts has been rotated in said direction through a predetermined distance;

structure maintaining said shafts interconnected together until the same have rotated through said arc in the opposite direction;

said interconnecting means including a slotted arm rigid to and extending outwardly from said other shaft, and lever means pivotally coupling said one shaft to said arm, said maintaining structure including a projection on said lever means, said projection being disposed in said slot as said shafts rotate in said opposite direction through said arc, and means for shifting the projection out of the slot as said shafts approach the end of said arc rotating in said opposite direction; and means coupled with said one shaft for rotating the same.

References Cited

UNITED STATES PATENTS

| | | | |
|---|---|---|---|
| 2,699,106 | 1/1955 | Hoyer | 137—609 X |
| 2,789,801 | 4/1957 | Durbin | 137—609 X |

FOREIGN PATENTS

| | | |
|---|---|---|
| 735,292 | 5/1943 | Germany. |
| 739,350 | 9/1943 | Germany. |

WILLIAM F. O'DEA, *Primary Examiner.*

D. H. LAMBERT, *Assistant Examiner.*